(12) United States Patent
Hiekata

(10) Patent No.: US 11,111,654 B2
(45) Date of Patent: Sep. 7, 2021

(54) INTERFERENCE PREVENTION DEVICE FOR CONSTRUCTION MACHINERY

(71) Applicants: Kobe Steel, Ltd., Kobe (JP); KOBELCO CONSTRUCTION MACHINERY CO., LTD., Hiroshima (JP)

(72) Inventor: Takashi Hiekata, Kobe (JP)

(73) Assignees: KABUSHIKI KAISHA KOBE SEIKO SHO (Kobe Steel, Ltd.), Kobe (JP); KOBELCO CONSTRUCTION MACHINERY CO., LTD., Hiroshima (JP)

( * ) Notice: Subject to any disclaimer, the term of this patent is extended or adjusted under 35 U.S.C. 154(b) by 247 days.

(21) Appl. No.: 16/081,271

(22) PCT Filed: Feb. 10, 2017

(86) PCT No.: PCT/JP2017/004838
§ 371 (c)(1),
(2) Date: Aug. 30, 2018

(87) PCT Pub. No.: WO2017/150135
PCT Pub. Date: Sep. 8, 2017

(65) Prior Publication Data
US 2019/0024348 A1     Jan. 24, 2019

(30) Foreign Application Priority Data
Mar. 2, 2016   (JP) .............................. JP2016-040045

(51) Int. Cl.
*E02F 9/20*     (2006.01)
*E02F 9/26*     (2006.01)
(Continued)

(52) U.S. Cl.
CPC ................ *E02F 9/267* (2013.01); *E02F 3/43* (2013.01); *E02F 3/435* (2013.01); *E02F 9/2033* (2013.01);
(Continued)

(58) Field of Classification Search
CPC ......... E02F 9/267; E02F 9/2033; E02F 9/265; E02F 3/435; E02F 9/24; E02F 3/43; E02F 9/264; H04N 7/188
See application file for complete search history.

(56) References Cited

U.S. PATENT DOCUMENTS 5,957,989 A * 9/1999 Egawa .................. E02F 9/2033
                                                            701/50
9,113,047 B2 * 8/2015 Onuma .................... G05B 9/02

FOREIGN PATENT DOCUMENTS

CN        1165895 A     11/1997
CN      101952520 A     1/2011
(Continued)

OTHER PUBLICATIONS

International Search Report dated May 16, 2017 in PCT/JP2017/004838 filed Feb. 10, 2017.
(Continued)

*Primary Examiner* — Donald J Wallace
*Assistant Examiner* — Daniel M. Robert
(74) *Attorney, Agent, or Firm* — Oblon, McClelland, Maier & Neustadt, L.L.P.

(57) ABSTRACT

A region removing unit determines a coordinate region of a boom indicating a region in distance image data by using posture information acquired by an acquisition unit, and removes pixel data constituting the determined coordinate region from the distance image data. An interference determination unit detects an interference object that is a work device or a grasped object of the work device by using the
(Continued)

distance image data obtained by removing the pixel data constituting the coordinate region to determine danger of interference of the detected interference object in a cab. When the interference determination unit determines that there is danger of interference, an interference prevention unit performs at least one of a warning to an operator and operation restriction of the work device.

17 Claims, 11 Drawing Sheets

(51) Int. Cl.
*E02F 9/24* (2006.01)
*H04N 7/18* (2006.01)
*E02F 3/43* (2006.01)

(52) U.S. Cl.
CPC .............. *E02F 9/24* (2013.01); *E02F 9/265* (2013.01); *H04N 7/188* (2013.01); *E02F 9/264* (2013.01)

(56) References Cited

FOREIGN PATENT DOCUMENTS

| | | | |
|---|---|---|---|
| EP | 2 631 374 A1 | 8/2013 | |
| JP | 3-156037 A | 7/1991 | |
| JP | 6-8461 U | 2/1994 | |
| JP | 8-4047 A | 1/1996 | |
| JP | 11-213154 A | 8/1999 | |
| JP | 2001-64992 A | 3/2001 | |
| JP | 3198249 B2 | 8/2001 | |
| JP | 2005-248502 A | 9/2005 | |
| JP | 2008-303574 A | 12/2008 | |
| JP | 2012-225111 A | 11/2012 | |
| JP | 2014-215039 A | 11/2014 | |
| JP | 2014-224410 A | 12/2014 | |
| JP | 2014224410 A * | 12/2014 | |
| WO | WO 2008/047872 A1 | 4/2008 | |
| WO | WO-2008047872 A1 * | 4/2008 | ............ B25J 9/1697 |
| WO | WO-2009047872 A1 * | 4/2009 | ............ B60C 11/033 |
| WO | WO-2014073571 A1 * | 5/2014 | ................ B60P 1/00 |

OTHER PUBLICATIONS

Extended European Search Report dated Feb. 20, 2019 in the corresponding European Application No. 17759606.1 9 pages.

* cited by examiner

SECTION (a)

SECTION (b)

INTERFERENCE PREVENTION DEVICE FOR CONSTRUCTION MACHINERY

TECHNICAL FIELD

The present invention relates to an interference prevention device for a construction machine for preventing interference of an interference object such as a work device of the construction machine or a grasped object of the work device in a main body of the construction machine.

BACKGROUND ART

In a construction machine, a user may attach an attachment other than attachments assumed by a manufacturer of the construction machine. A construction machine such as a demolition machine may grasp a member of a demolished building or the like. In these cases, since it is likely that the attachment, the member of the demolished building, or the like becomes an interference object and interferes in a cab, it is necessary to prevent the interference in advance. Therefore, by attaching a sensor to a main body of the construction machine and detecting a distance between the cab and the interference object, the interference by the interference object in the cab is prevented.

For example, as illustrated in FIG. 9, Patent Literature 1 discloses an interference prevention device for determining whether a bucket (37) has entered an interference dangerous region that is set in front of a cab (32) by using a plurality of ultrasonic sensors (11).

As illustrated in FIG. 10, Patent Literature 2 discloses a worker detection device that detects a color of a safety vest worn by the worker with a wide area camera (1), determines with a laser rangefinder (2) whether the worker is present in an operating range when this color is detected, measures three-dimensional postures of the wide area camera (1) and a construction vehicle (8) with a three-dimensional posture sensor (3), corrects a measurement range of the laser rangefinder (2) that changes depending on the posture of the construction vehicle (8) by using a measurement result, and monitors the measurement result.

As illustrated in FIG. 11, Patent Literature 3 discloses a technique to attach a first stereo camera (21) and a second stereo camera (22) to an upper part in a front direction of a cabin of a hydraulic excavator (520) at required intervals, and to detect an obstacle based on stereo images obtained by these stereo cameras. According to Patent Literature 3, in addition to measurement of a position of the obstacle in a wide range by attachment of the plurality of stereo cameras, accurate calibration can be performed because part of measurement regions of the stereo cameras is superimposed.

Meanwhile, a construction machine includes a movable part that is free from interference in the cab, even if the movable part is designed to be close to the cab. For example, an excavator is equipped with a boom, an arm, and a bucket in order from the cab. At least the boom is free from interference in the cab because the boom is attached beside the cab such that the boom can be raised and lowered, and does not grasp an object to be grasped.

However, since sensing is not performed in consideration of the movable part that is free from interference in the cab, these conventional techniques described in Patent Literatures 1 to 3 have a problem that this movable part is falsely detected as an interference object and an operation stop for avoiding interference or an unnecessary warning frequently occurs.

Meanwhile, if a distance sensor is disposed such that the movable part free from interference is excluded from a detection range in order to avoid such false detection, a safety problem arises that the detection range of the distance sensor becomes narrow and that the interference object to be originally detected cannot be detected.

CITATION LIST

Patent Literature

Patent Literature 1: Japanese Patent Application Laid-Open No. 2001-64992
Patent Literature 2: Japanese Patent Application Laid-Open No. 2012-225111
Patent Literature 3: Japanese Patent Application Laid-Open No. 2014-215039

SUMMARY OF INVENTION

It is an object of the present invention to provide an interference prevention device for a construction machine, the interference prevention device capable of preventing a movable part that is free from interference from being detected as an interference object, and preventing that an unnecessary operation stop or warning frequently occurs, without narrowing a detection range of a distance sensor.

An interference prevention device for a construction machine according to one aspect of the present invention is an interference prevention device for a construction machine including a work device including a plurality of movable parts and having a changeable posture, a cab, and a main body on which the work device and the cab are mounted. The interference prevention device includes: a distance sensor configured to acquire distance image data indicating distance distribution in a surrounding environment of the cab; an interference determination unit configured to detect an interference object that is the work device or a grasped object of the work device by using the distance image data acquired by the distance sensor, and determine danger of interference of the detected interference object in the cab; an interference prevention unit configured to perform at least one of a warning to an occupant and operation restriction of the construction machine when the interference determination unit determines that there is the danger of interference; an acquisition unit configured to acquire posture information indicating a posture of the work device; and a region removing unit configured to determine pixel data corresponding to a specified movable part that does not interfere in the cab among the plurality of movable parts in the distance image data by using the posture information acquired by the acquisition unit, and remove the determined pixel data from the distance image data. The interference determination unit determines the danger of interference by using the distance image data from which the pixel data corresponding to the specified movable part has been removed.

With this configuration, even if the specified movable part enters the detection range of the distance sensor, it is possible to prevent the specified movable part from being falsely detected as the interference object, and to prevent unnecessary operation stop and issue of warnings. Furthermore, since it is unnecessary to dispose the distance sensor such that the specified movable part is excluded from the detection range, it is possible to prevent the detection range from becoming narrow and to prevent that the interference object to be originally detected cannot be detected.

DESCRIPTION OF EMBODIMENTS

Figure 1:
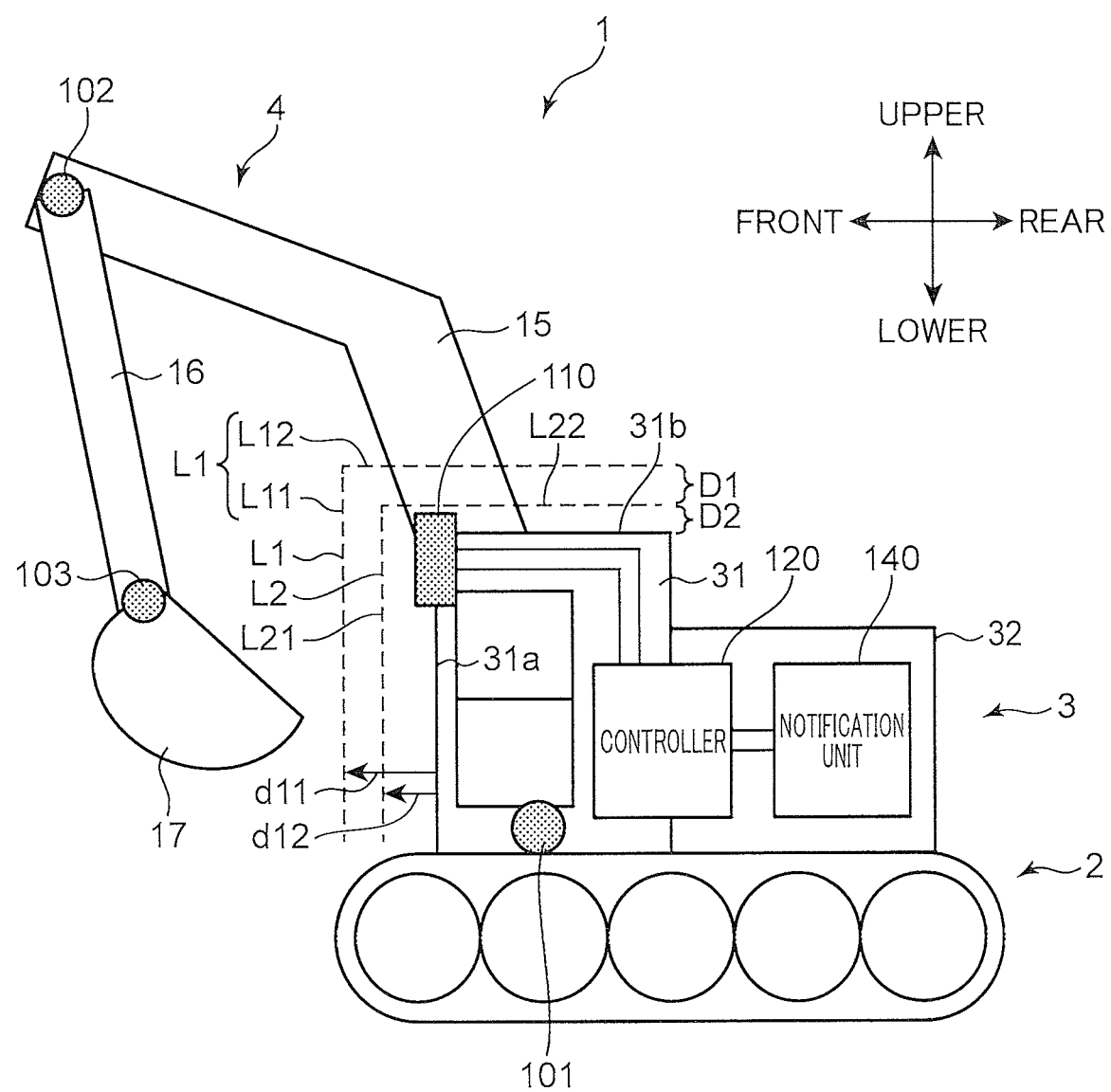
FIG. 1 is an external view of a construction machine to which an interference prevention device according to an embodiment of the present invention is applied.

FIG. 1 is an external view of a construction machine 1 to which an interference prevention device according to an embodiment of the present invention is applied. Here, a hybrid excavator is described as the construction machine 1 as an example, but the interference prevention device may be applied to other construction machines such as an excavator and a crane. Hereinafter, a front side direction of a cab 31 is described as a front direction, a rear side direction of the cab 31 is described as a rear direction, an upper side direction of the cab 31 is described as an upper direction, and a lower side direction of the cab 31 is described as a lower direction. The front and rear directions are collectively described as a front-rear direction, and the upper and lower directions are collectively described as an upper-lower direction. When looking in the front direction from the cab 31, a left side direction is described as a left direction, and a right side direction is described as a right direction. The right and left directions are collectively described as a right-left direction.

The construction machine 1 includes a crawler type lower travelling body 2, an upper slewing body 3 provided on the lower travelling body 2 in a rotatable manner (one example of a main body), and a posture-changeable work device 4 attached to the upper slewing body 3.

The work device 4 includes a boom 15 attached to the upper slewing body 3, for example, adjacently to the right direction of the cab 31 such that the boom 15 can be raised and lowered, an arm 16 pivotably attached to a tip portion of the boom 15, and an attachment 17 pivotably attached to a tip portion of the arm 16. Here, the boom 15, the arm 16, and the attachment 17 correspond to one example of a plurality of movable parts. In the following description, it is assumed that the boom 15 corresponds to one example of a specified movable part that does not interfere in the cab 31. As the attachment 17, a bucket, a crusher, a demolition machine, or the like may be employed.

The upper slewing body 3 is composed of a box body, and includes the cab 31 an operator boards. In the cab 31, a front side surface is described as a front surface 31a, and an upper side surface is described as an upper surface 31b.

In the front direction of the cab 31, a warning region D1 and an automatic driving region D2 are set in order from the front side. The warning region D1 is a region for notifying the operator that an interference object is approaching the cab 31 and that danger is imminent when the interference object enters the warning region D1, and for restricting the operation of the work device 4. The automatic driving region D2 is a region for automatically stopping or restricting the operation of the work device 4 when the interference object enters the automatic driving region D2.

The warning region D1 is defined by a boundary plane L1 and a boundary plane L2. The boundary plane L1 includes a boundary plane L11 facing the front surface 31a and a boundary plane L12 facing the upper surface 31b. The boundary plane L11 is a plane that is set parallel to the front surface 31a at a position apart from the front surface 31a by a distance d11 in the front direction. The boundary plane L12 is a plane that is set parallel to the upper surface 31b at a position apart from the upper surface 31b by a distance d11 in the upper direction.

The automatic driving region D2 is defined by the boundary plane L2, the front surface 31a, and the upper surface 31b. The boundary plane L2 includes a boundary plane L21 facing the front surface 31a and a boundary plane L22 facing the upper surface 31b. The boundary plane L21 is a plane that is set parallel to the front surface 31a at a position apart from the front surface 31a by a distance d12 (<d11) in the front direction. The boundary plane L22 is a plane that is set apart from the upper surface 31b by a distance d12 in the upper direction.

Note that the lowest ends of the warning region D1 and the automatic driving region D2 are provided, for example, in the front direction of a lower portion of the cab 31. Widths of the warning region D1 and the automatic driving region D2 in the right-left direction are set, for example, at a width of the front surface 31a in the right-left direction or a width obtained by adding a slight margin to the above width. However, these are one example, and the lowest ends of the warning region D1 and the automatic driving region D2 and the widths in the right-left direction may not be defined. The warning region D1 and the automatic driving region D2 may be provided only in the front direction of the front surface 31a, and may not be provided in the upper direction of the upper surface 31b. Hereinafter, the three-dimensional coordinate system in which the warning region D1 and the automatic driving region D2 are set is described as a three-dimensional coordinate system of the construction machine 1.

A distance sensor 110 is provided at a predetermined position (here, an upper end) of the front surface 31a. The distance sensor 110 is installed on the front surface 31a such that a measurement range can cover at least an entire region of the boundary plane L21. This will prevent occurrence of a dead angle of the distance sensor 110 in the warning region D1 facing the front surface 31a, and allow the construction machine 1 to issue a warning to the operator by the time the interference object enters the automatic driving region D2.

The construction machine 1 further includes angle sensors 101, 102, and 103. The angle sensor 101 is provided at a rotational fulcrum of the boom 15 and measures a rotation angle of the boom 15. The angle sensor 102 is provided at a rotational fulcrum of the aim 16 and measures a rotation angle of the arm 16. The angle sensor 103 is provided at a rotational fulcrum of the attachment 17 and measures a rotation angle of the attachment 17.

The upper slewing body 3 is provided with a controller 120 that is electrically connected to the distance sensor 110 and controls the entire construction machine 1. In the cab 31, a notification unit 140 is provided for notifying the operator of conditions of the construction machine 1 under the control of the controller 120.

Figure 2:
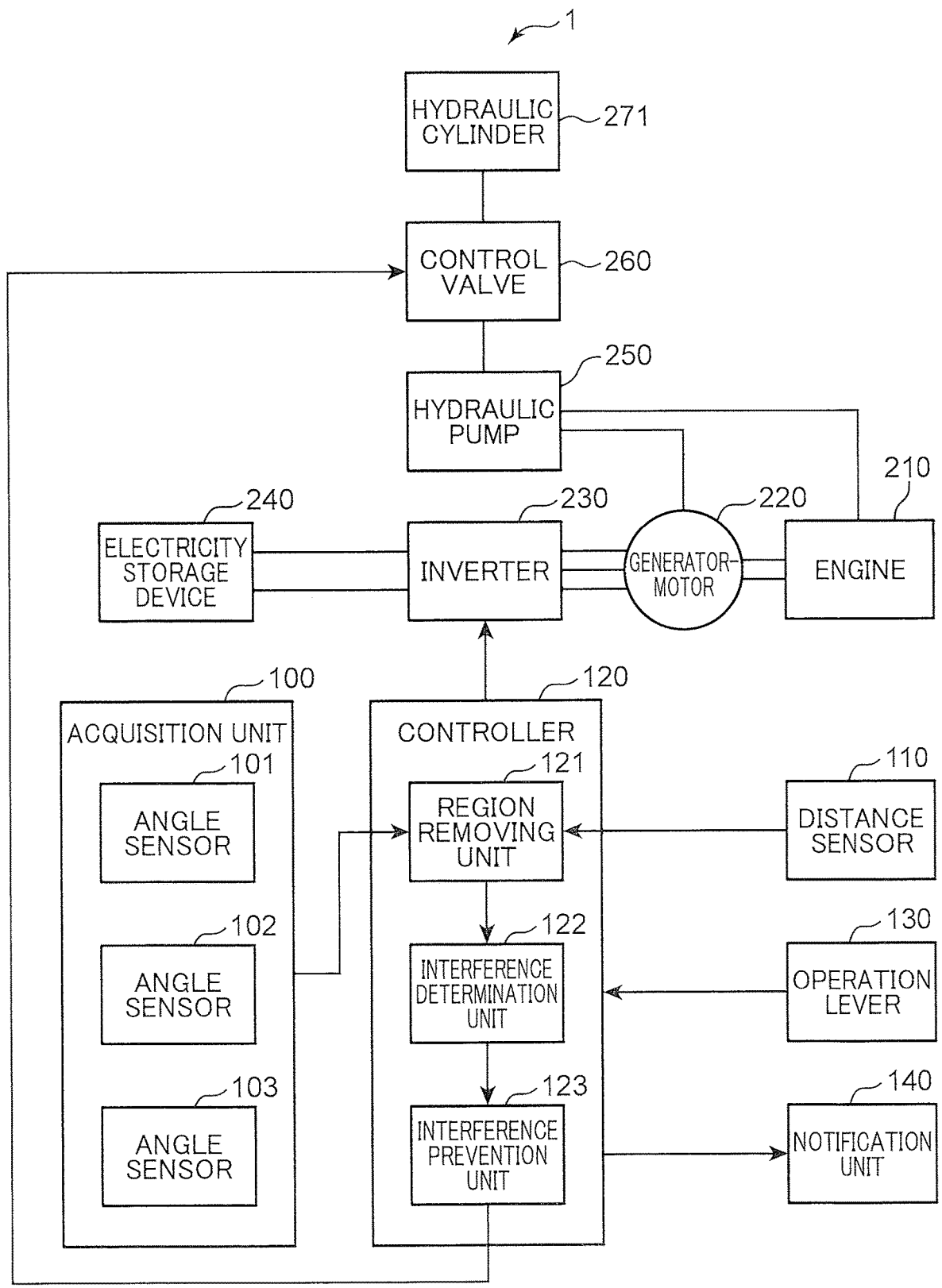
FIG. 2 is a block diagram illustrating one example of a system configuration of the construction machine illustrated in FIG. 1.

FIG. 2 is a block diagram illustrating one example of a system configuration of the construction machine 1 illustrated in FIG. 1. The construction machine 1 includes an engine 210, a hydraulic pump 250 and a generator-motor 220 coupled with an output shaft of the engine 210, a control valve 260 that controls supply and discharge of an operating oil from the hydraulic pump 250 to a hydraulic cylinder 271, an electricity storage device 240 that can charge electric power generated by the generator-motor 220, and an inverter 230 that converts electric power of the electricity storage device 240 and the generator-motor 220.

The hydraulic pump 250 operates by motive power of the engine 210 and discharges the operating oil. The operating oil discharged from the hydraulic pump 250 is guided to the hydraulic cylinder 271 with a flow rate controlled by the control valve 260.

Under the control of the controller 120, the control valve 260 sets a valve opening at an opening according to an operation level of an operation lever 130.

The hydraulic cylinder 271 includes a boom cylinder that raises and lowers the boom 15 with respect to the upper slewing body 3 by expanding and contracting on receipt of supply of the operating oil, an arm cylinder that pivots the arm 16 with respect to the boom 15 by expanding and contracting on receipt of supply of the operating oil, and a bucket cylinder that pivots the attachment 17 with respect to the arm 16 by expanding and contracting on receipt of supply of the operating oil.

The generator-motor 220 has a configuration as a generator that converts motive power of the engine 210 into electric power, and a configuration as a motor that converts electric power stored in the electricity storage device 240 into motive power. In an example of FIG. 2, the generator-motor 220 is, for example, a three-phase motor, but this is one example, and the generator-motor 220 may be a single-phase motor.

The electricity storage device 240 is configured of, for example, various secondary batteries such as a lithium ion battery, a nickel hydrogen battery, an electric double layer capacitor, and a lead battery.

Under the control of the controller 120, the inverter 230 controls switching between an operation as the generator of the generator-motor 220 and an operation as the motor of the generator-motor 220. Also, under the control of the controller 120, the inverter 230 controls a current for the generator-motor 220 and torque of the generator-motor 220. In the example of FIG. 2, the inverter 230 is, for example, a three-phase inverter, but this is one example and may be a single-phase inverter.

Furthermore, the construction machine 1 includes an acquisition unit 100, and the distance sensor 110, the controller 120 and the notification unit 140 illustrated in FIG. 1, and the operation lever 130 for receiving an operation by the operator for changing the posture of the work device 4.

The acquisition unit 100 includes the angle sensors 101, 102, and 103 described in FIG. 1, and acquires posture information indicating the posture of the work device 4. Here, the rotation angle of the boom 15, the rotation angle of the arm 16, and the rotation angle of the attachment 17 correspond to the posture information.

The distance sensor 110 measures a distance from the distance sensor 110 to an object located around the cab 31. In the present embodiment, the distance sensor 110 is, for example, a depth sensor including a light source emitting an infrared ray, a camera that can receive an infrared ray and visible light, and a processor that processes image data captured by the camera.

The distance sensor 110 is, for example, a depth sensor that emits an infrared ray at constant time intervals (for example, 30 fps) and measures time from emitting the infrared ray to receiving reflected light in pixel units. The distance sensor 110 acquires distance image data indicating distance distribution in a surrounding environment of the cab 31.

The depth sensor that emits an infrared ray has been increasingly used in practical applications in recent years as a distance measuring unit. The depth sensor is used as an input interface for inputting gestures in games and the like. Furthermore, since the construction machine 1 is sometimes used at night, the depth sensor using an infrared ray is useful for the construction machine 1. Note that for the depth sensor that emits an infrared ray, a method for measuring time from emitting an infrared ray to receiving reflected light as described above is known as a time of flight (ToF) method. In addition, as the depth sensor, a pattern emission method for measuring a distance from a light-receiving pattern of reflected light when light of a specified pattern is emitted is known. This pattern emission depth sensor may be employed. Since the construction machine 1 often works outdoors, a laser scanning ToF depth sensor that is resistant to interference with sunlight may be employed.

Here, the depth sensor is used as the distance sensor 110, but the present invention is not limited to this example. The distance sensor 110 may include a stereo camera that is relatively less expensive than the depth sensor. In this case, the distance sensor 110 is composed of, for example, a stereo camera and a processor that calculates distance distribution from a plurality of pieces of image data captured by a plurality of cameras constituting the stereo camera to an object.

The operation lever 130 is operated, for example, by the operator and outputs a signal indicating the operation level to the controller 120.

The controller 120 includes, for example, a processor such as a microcontroller and a storage device that stores a program and the like. The controller 120 includes a region removing unit 121, an interference determination unit 122, and an interference prevention unit 123. The region removing unit 121, the interference determination unit 122, and the interference prevention unit 123 may be configured of dedicated hardware circuits, or may be implemented by a CPU executing a program.

By using the posture information acquired by the acquisition unit 100, the region removing unit 121 determines pixel data corresponding to the boom 15 in the distance image data, and removes the determined pixel data from the distance image data. Hereinafter, the distance image data from which the pixel data corresponding to the boom 15 is removed is described as valid processing data.

Figure 3:
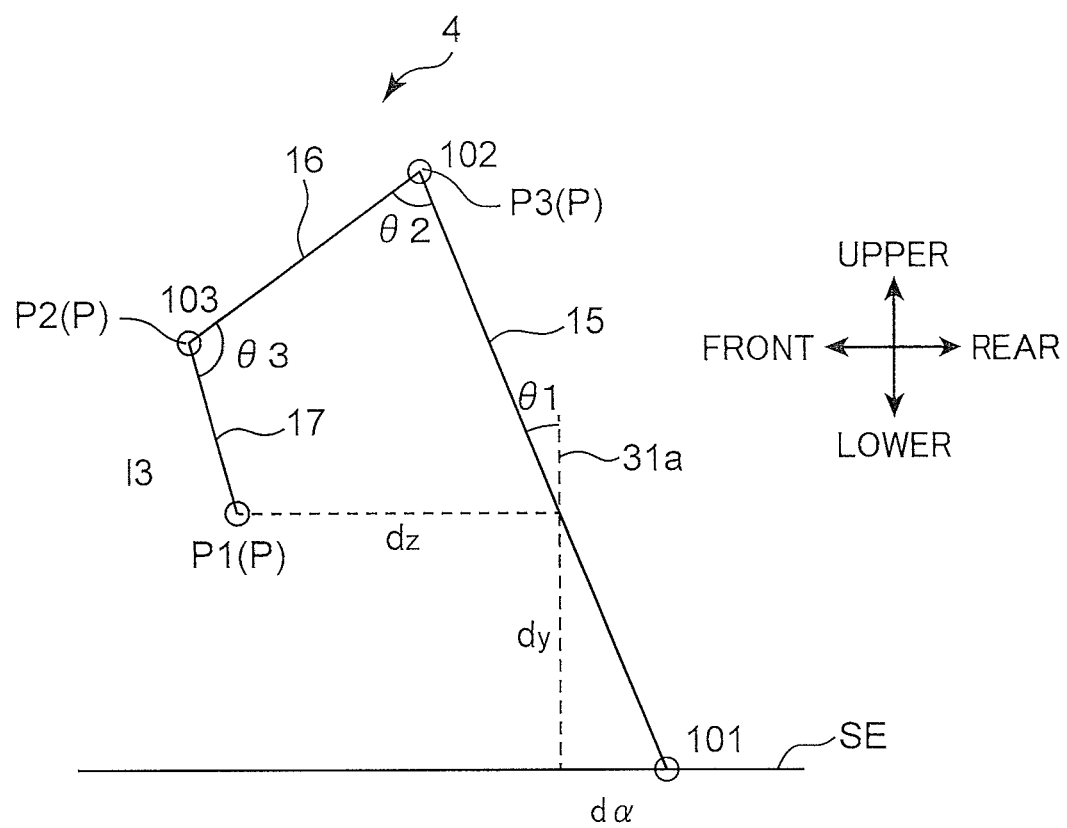
FIG. 3 is a diagram illustrating a work device in a simplified manner.

FIG. 3 is a diagram illustrating the work device 4 in a simplified manner. In FIG. 3, the boom 15, the arm 16, and the attachment 17 are each illustrated with a straight line to simplify the description. In an example of FIG. 3, in the coordinate system of the construction machine 1, the front surface 31a is set as the origin in the front-rear direction, a reference plane SE is set as the origin in the upper-lower direction, and the center in the right-left direction of the front surface 31a is set as the origin in the right-left direction.

Lengths of the boom 15, the aim 16, and the attachment 17 are known. A distance dα between the front surface 31a of the cab 31 and the angle sensor 101 in the front-rear direction is also known. Therefore, if a rotation angle θ1 of the boom 15 with respect to the front surface 31a, a rotation angle θ2 of the arm 16 with respect to the boom 15, and a rotation angle θ3 of the attachment 17 with respect to the arm 16 are known, by using a trigonometric function, it is possible to calculate an altitude dy and a depth dz of a representative point P of the work device 4 (for example, a tip P1 of the attachment 17, a tip P2 of the arm, and a tip P3 of the boom). Here, the altitude dy refers to, for example, a distance in the upper-lower direction from the reference plane SE parallel to the front-rear direction to the point P, whereas the depth dz refers to, for example, a distance in the front-rear direction from the front surface 31a to the point P.

Therefore, if the rotation angles θ1 to θ3 are known, the three-dimensional coordinate system of the construction machine 1, that is, the position of the point P in the real space can be identified. Then, if the point P is known, it is possible to determine in which coordinate region of the distance image data measured by the distance sensor 110 the boom 15, the arm 16, and the attachment 17 appear, from an angle of view, an attachment position, and an angle of an optical axis of the distance sensor 110.

Therefore, in the present embodiment, the region removing unit 121 illustrated in FIG. 2 has correspondence information indicating in advance in which coordinate region the boom 15 is located in the distance image data according to the posture information. Then, by using the correspondence information, the region removing unit 121 determines pixel data corresponding to the boom 15 according to the posture information measured by the distance sensor 110.

As the correspondence information, for example, data in which the rotation angle θ1 of the boom 15 is associated with coordinates of a plurality of representative points on an outer edge of the coordinate region according to the rotation angle θ1 can be employed. As the representative points, for example, coordinates of vertices of the coordinate region can be employed. Note that in an example of distance image data G401 illustrated in FIG. 4, a coordinate region 411 indicates the boom 15, but the coordinate region 411 does not include vertices. In this case, as the representative points, for example, the coordinates of three vertices of the triangular coordinate region 411 appearing in the distance image data G401 can be employed.

By using the valid processing data, the interference determination unit 122 detects the work device 4 or an interference object which is a grasped object of the work device 4, and determines danger of interference of the detected interference object in the cab 31.

Here, the interference determination unit 122 determines the danger of interference caused by the interference object depending on whether the depth of the detected interference object has entered the warning region D1 or the automatic driving region D2.

Specifically, the interference determination unit 122 may determine that the interference object is located at a coordinate having the minimum depth in the valid processing data, and detect the depth of the coordinate as the depth of the interference object.

Then, the interference determination unit 122 may convert the height and depth of the detected interference object from the three-dimensional coordinate system of the distance sensor 110 into the three-dimensional coordinate system of the construction machine 1, and then determine whether the converted height and depth have entered the warning region D1 or the automatic driving region D2.

Alternatively, the interference determination unit 122 may determine whether the interference object has entered the warning region D1 or the automatic driving region D2 by using only the depth. In this case, the interference determination unit 122 converts the minimum depth in the distance image data into the three-dimensional coordinate system of the construction machine 1. If the obtained depth is located within the range of the distance d12 from the front surface 31a, the interference determination unit 122 may determine that the interference object has entered the automatic driving region D2. If the obtained depth is located at the distance d12 or more and within the range of the distance d11 from the front surface 31a, the interference determination unit 122 may determine that the interference object has entered the warning region D1.

When the interference determination unit 122 determines that there is danger of interference, the interference prevention unit 123 performs at least one of a warning to the operator and an operation restriction of the work device 4. Specifically, when the interference determination unit 122 determines that the interference object is located in the warning region D1, the interference prevention unit 123 causes the notification unit 140 to issue a warning.

As a warning mode, it is possible to employ a mode to cause a buzzer to sound, a mode to turn on or blink a warning lamp, or a mode to display a warning message on a display panel. Alternatively, a mode combining these modes may be employed as the warning mode.

When the interference determination unit 122 determines that the interference object is located in the automatic driving region D2, the interference prevention unit 123 restricts the operation of the work device 4 by decelerating or automatically stopping the work device 4.

In this case, the interference prevention unit 123 may decelerate the work device 4 by correcting the opening of the valve of the control valve 260 that is set according to the operation level of the operation lever 130 in a direction to decelerate the work device 4. Furthermore, in this case, the interference prevention unit 123 may increase the deceleration level of the work device 4 as the depth of the interference object becomes closer to the cab 31.

The notification unit 140 includes a buzzer, a display panel, and a warning lamp provided inside the cab 31. The notification unit 140 issues a warning to the operator under the control of the interference prevention unit 123.

Figure 5:
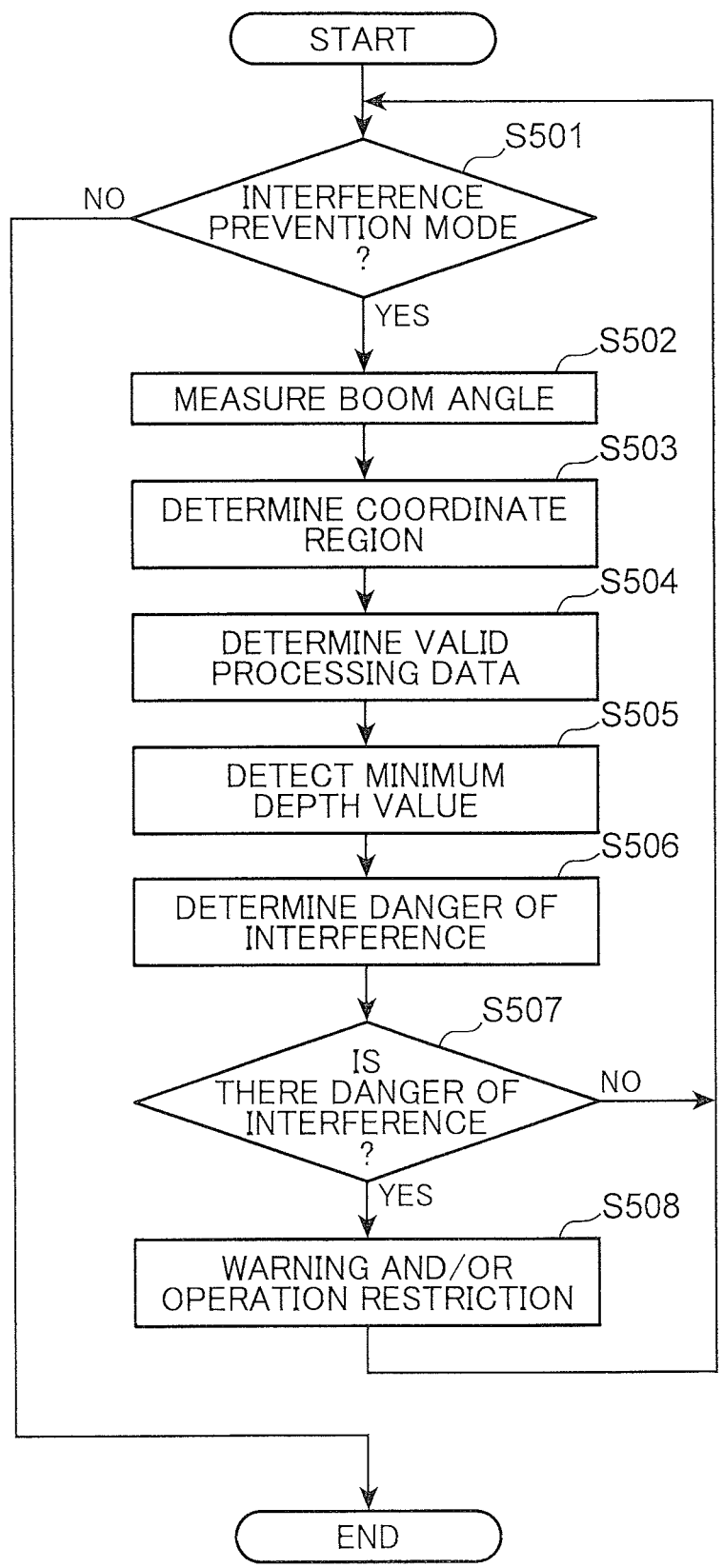
FIG. 5 is a flowchart illustrating a process of the construction machine illustrated in FIG. 1.

Next, the process of the construction machine 1 illustrated in FIG. 1 will be described. FIG. 5 is a flowchart illustrating the process of the construction machine 1 illustrated in FIG. 1.

This flowchart starts when the construction machine 1 starts an excavation or demolition operation. The start of the cutting or demolition operation may be determined from the operation level of the operation lever 130. First, if a mode of the construction machine 1 is set at an interference prevention mode (YES in S501), the process proceeds to S502. If the mode of the construction machine 1 is not set at the interference prevention mode (NO in S501), the process ends. Here, the interference prevention mode is a mode to perform a warning or operation restriction when the interference object approaches the cab 31.

In S502, the angle sensor 101 measures the rotation angle θ1 of the boom 15. Next, by using the correspondence information, the region removing unit 121 determines the coordinate region according to the rotation angle θ1 (S503).

Next, the region removing unit 121 removes pixel data constituting the determined coordinate region from the distance image data and determines remaining distance image data as valid processing data (S504).

Next, the interference determination unit 122 detects the minimum depth value in the valid processing data as the depth of the interference object (S505).

Here, an unintended obstacle such as rain, snow, and insects may be reflected in the distance image data. If the depth of the unintended obstacle is smaller than the depth of the interference object, the unintended obstacle may be falsely detected as the interference object. Therefore, to prevent this false detection, a process of removing the unintended obstacle may be provided in a preceding stage of the process of S505. In this case, the interference determination unit 122 may perform, for example, a process of removing an object having a certain area or less from among one or more objects included in the valid process data, or a smoothing process.

Next, the interference determination unit 122 determines the danger of interference based on whether the depth of the interference object has entered the warning region D1 or the automatic driving region D2 (S506). Here, the interference determination unit 122 may obtain a velocity of the interference object by using the distance image data for a certain time period in the past from the present time (past frames), and determine the danger of interference in consideration of this velocity. For example, even in the case where the depth of the interference object is located in the warning region D1, if the velocity of the interference object is in a direction away from the cab 31, the interference determination unit 122 may determine that there is no danger of interference.

Next, when the interference determination unit 122 determines that there is danger of interference (YES in S507), the interference prevention unit 123 performs a warning or operation restriction (S508) and returns the process to S501. On the other hand, when the interference determination unit 122 determines that there is no danger of interference (NO in S507), the process returns to S501.

Note that in the above flowchart, when it is determined that the interference object has entered the warning region D1, only a warning is issued, but the work device 4 may be decelerated. When it is determined that the interference object has entered the automatic driving region D2, the interference prevention unit 123 may automatically stop the work device 4. Alternatively, when it is determined that the interference object has entered the warning region D1, regardless of the operation level of the operation lever 130, the interference prevention unit 123 may restrict the operation of the work device 4 to prevent the interference object from entering the automatic driving region D2. The flowchart illustrated in FIG. 5 is repeated as long as the interference prevention mode is valid.

Figure 4:
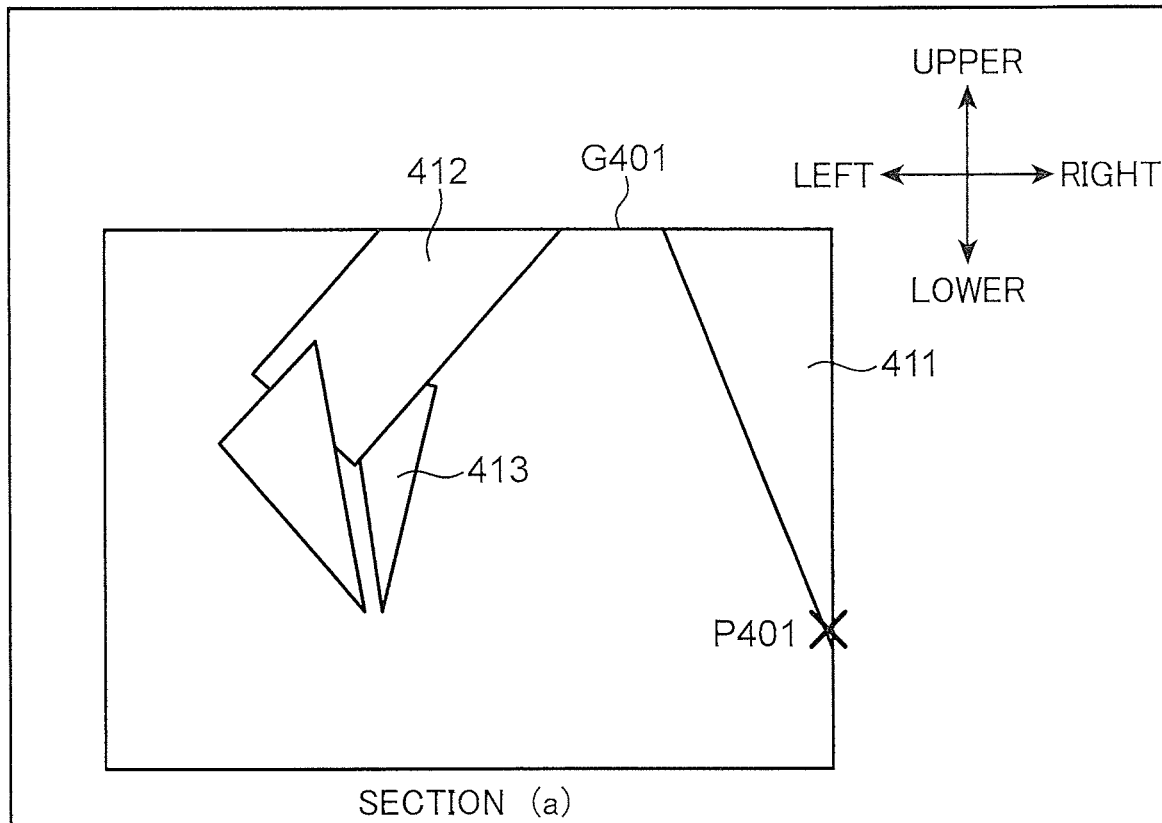
FIG. 4 is an explanatory diagram of a process of removing a coordinate region from distance image data.
Figure 4:
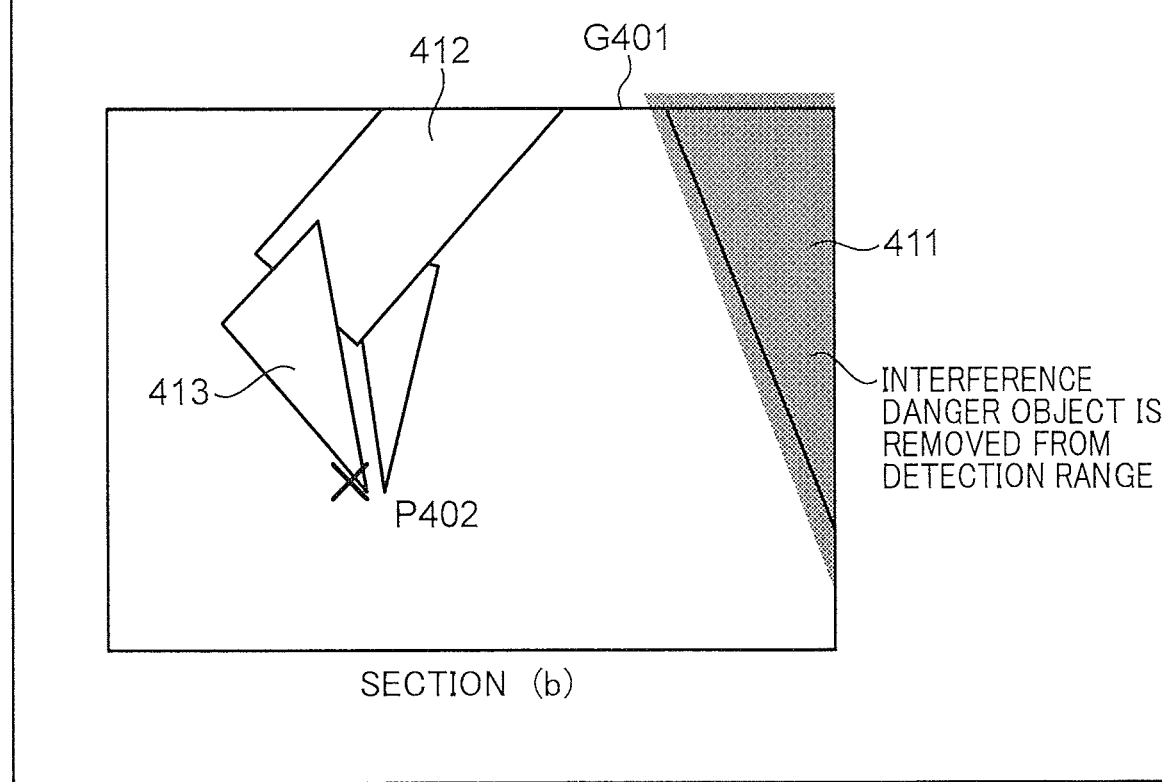

Next, the process of determining the valid processing data will be described in detail. FIG. 4 is an explanatory diagram of the process of removing pixel data constituting the coordinate region 411 from the distance image data. In FIG. 4, section (a) indicates the distance image data G401 when the pixel data constituting the coordinate region 411 is not removed, whereas section (b) indicates the distance image data G401 when the pixel data constituting the coordinate region 411 is removed.

In FIG. 4, the coordinate region 411 indicates a region in which the boom 15 appears in the distance image data G401. An arm region 412 indicates a region in which the arm 16 appears in the distance image data G401, whereas an attachment region 413 indicates a region in which the attachment 17 appears.

In an example of section (a), the pixel data constituting the coordinate region 411 has not been removed from the distance image data G401. Therefore, the interference determination unit 122 detects a point P401 at the lower end of the coordinate region 411 appearing in the distance image data G401 as the position with the minimum depth. This is because the boom 15 is attached to the upper slewing body 3 so as to extend in the upper direction from the upper slewing body 3, and the depth decreases in the lower direction of the coordinate region 411.

However, if the point P401 is recognized as the closest point of the interference object, it is determined that there is danger of interference of the boom 15 that is originally free from interference from a design point of view of the construction machine 1. This will cause unnecessary warnings and operation restrictions, and is not practical.

Meanwhile, in section (b) of FIG. 4, the pixel data constituting the coordinate region 411 has been removed from the distance image data G401. Therefore, the interference determination unit 122 detects a point P402 at the tip of the attachment region 413 appearing in the distance image data G401 as the position with the minimum depth.

Accordingly, the point P402 at the tip of the attachment 17, which is the interference object to be originally detected, is detected as the closest point.

Thus, in the present embodiment, it is possible to prevent the boom 15 from being falsely detected as the interference object, even if the boom 15 of the construction machine 1 enters the measurement range of the distance sensor 110. On the other hand, when the boom 15 has not entered the measurement range of the distance sensor 110, it is possible to detect the interference object from a wide region in the front direction of the cab 31 of the construction machine 1 and to improve the safety of the construction machine 1.

(Modification 1)

Modification 1 is to prevent the region of the interference object from being removed as the coordinate region is removed, when the interference object is located on the near side of the boom 15 and the coordinate region of the boom 15 and the region of the interference object are superimposed and reflected in the distance image data.

Figure 6:
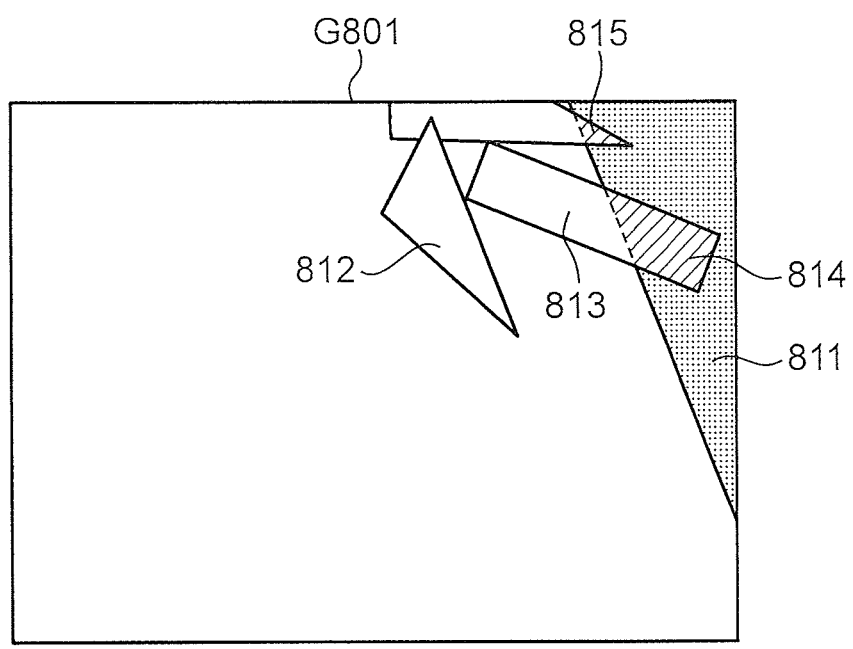
FIG. 6 is a diagram illustrating the distance image data in which an interference object is reflected in superimposition on the coordinate region.

FIG. 6 is a diagram illustrating distance image data G801 in which the interference object is reflected in superimposition on a coordinate region 811. In an example of FIG. 6, part of a grasped object region 813 indicating a grasped object and part of an attachment region 812 indicating the attachment 17 are superimposed on the coordinate region 811. In this case, if pixel data constituting the coordinate region 811 identified from the correspondence information is uniformly removed from the distance image data G801, pixel data constituting a superimposition region 814 of the grasped object region 813 superimposed on the coordinate region 811 (region indicated by hatching) and a superimposition region 815 of the attachment region 812 superimposed on the coordinate region 811 (region indicated by hatching) is removed from the distance image data G801, disabling accurate detection of the closest point of the interference object.

Figure 7:
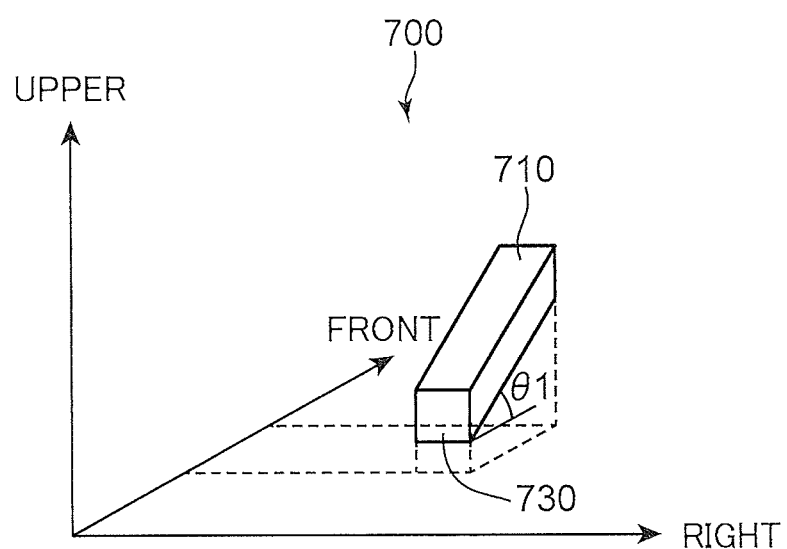
FIG. 7 is an explanatory diagram of a process of a region removing unit in modification 1.

Therefore, in modification 1, the region removing unit 121 performs the following process. FIG. 7 is an explanatory diagram of the process of the region removing unit 121 in modification 1. FIG. 7 illustrates a three-dimensional coordinate system 700 of the distance sensor 110. In FIG. 7, a vertical axis represents the upper direction, a horizontal axis represents the right direction, and a backward axis represents the front direction.

First, the region removing unit 121 calculates a three-dimensional region 710 of the boom 15 in the three-dimensional coordinate system 700 by using the rotation angle θ1 of the boom 15 measured by the angle sensor 101. Here, in the three-dimensional coordinate system 700, a length and cross-sectional area of the boom 15 are known, and a position of a proximal end 730 of the boom 15 is also known. In this case, the region removing unit 121 may calculate the three-dimensional region 710 by setting a square pillar having the cross-sectional area and length of the boom 15 in a direction of the rotation angle θ1 from the proximal end 730.

Next, by using the correspondence information, the region removing unit 121 determines the coordinate region corresponding to the rotation angle θ1 from within the distance image data. Next, the region removing unit 121 extracts the pixel data included in the three-dimensional region 710 from among the pixel data constituting the determined coordinate region, and removes the extracted pixel data from the distance image data. Specifically, the region removing unit 121 extracts the pixel data one by one from the coordinate region in a predetermined order. If the extracted pixel data is located in the three-dimensional region 710, the region removing unit 121 may determine that the pixel data is pixel data included in the three-dimensional region 710.

In this case, as illustrated in FIG. 6, a region obtained by excluding the superimposition regions 814 and 815 from the coordinate region 811 is removed, but the superimposition regions 814 and 815 remain. This makes it possible to prevent the entire region of the grasped object region 813 and the attachment region 812 from remaining in the valid processing data and the closest point of the interference object from being not detected.

(Modification 2)

In modification 1, the pixel data included in the three-dimensional region 710 is extracted from within the pixel data constituting the coordinate region, and the pixel data is removed from the distance image data. In modification 2, pixel data included in the three-dimensional region 710 is extracted from the pixel data constituting the distance image data, and the pixel data is removed from the distance image data.

In modification 2, the region removing unit 121 first calculates the three-dimensional region 710 by using the method described with reference to FIG. 7. Then, the region removing unit 121 extracts the pixel data included in the three-dimensional region 710 from among the pixel data constituting the distance image data, and removes the extracted pixel data from the distance image data. Specifically, the region removing unit 121 extracts the pixel data one by one from the distance image data in a predetermined order. If the extracted pixel data is located in the three-dimensional region 710, the region removing unit 121 may determine that the pixel data is pixel data included in the three-dimensional region 710.

Of the distance image data, data other than the pixel data included in the three-dimensional region 710 is not removed by the method of modification 2. Therefore, even if the grasped object region 813 and the attachment region 812 are superimposed on the coordinate region 811 as illustrated in FIG. 6, the superimposition regions 814 and 815 are not removed. Therefore, the closest point of the interference object can be accurately detected.

(Modification 3)

Figure 8:
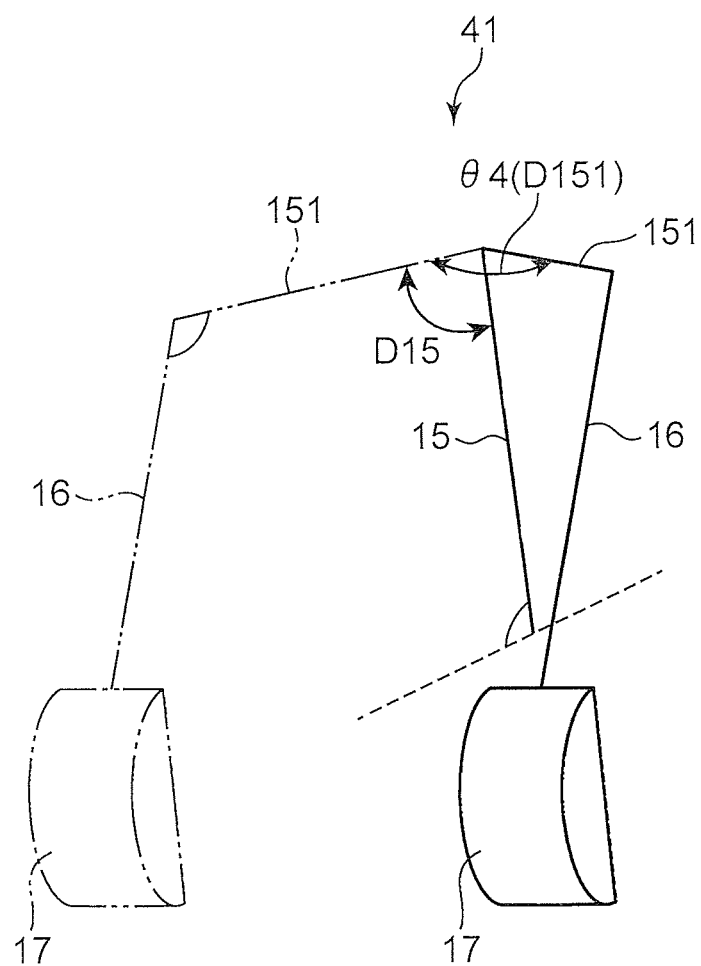
FIG. 8 is a diagram illustrating a work device in modification 3 in a simplified manner.
Figure 9:
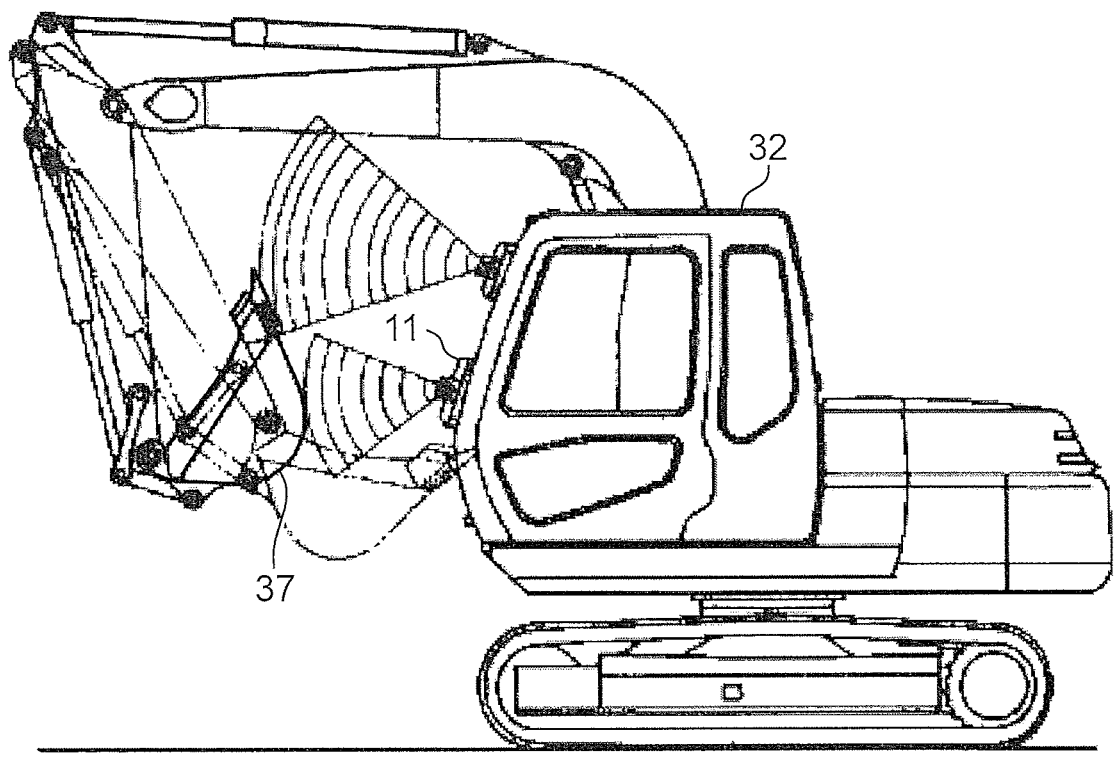
FIG. 9 is a diagram illustrating a conventional technique.
Figure 10:
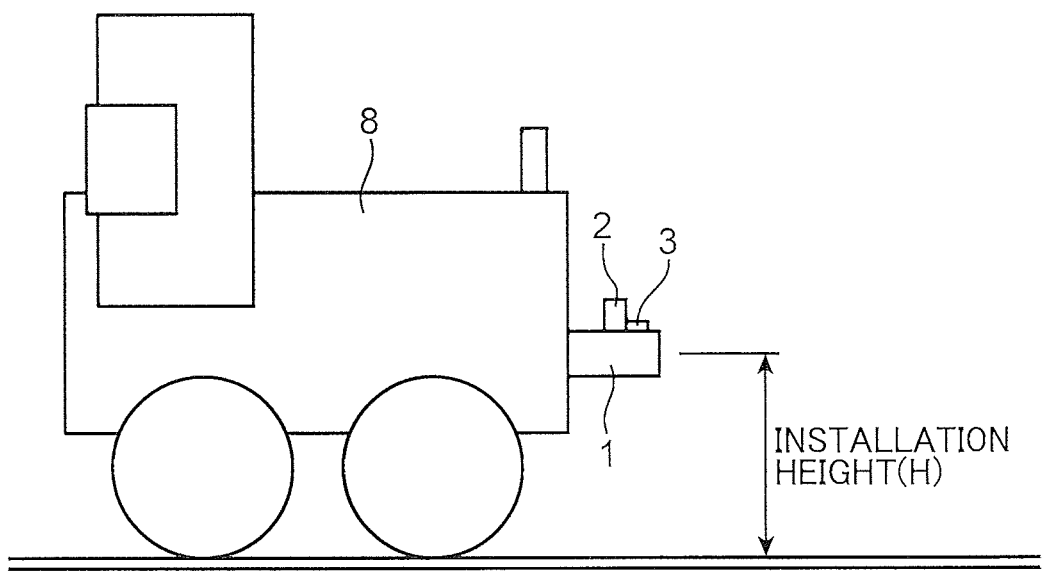
FIG. 10 is a diagram illustrating a conventional technique.
Figure 11:
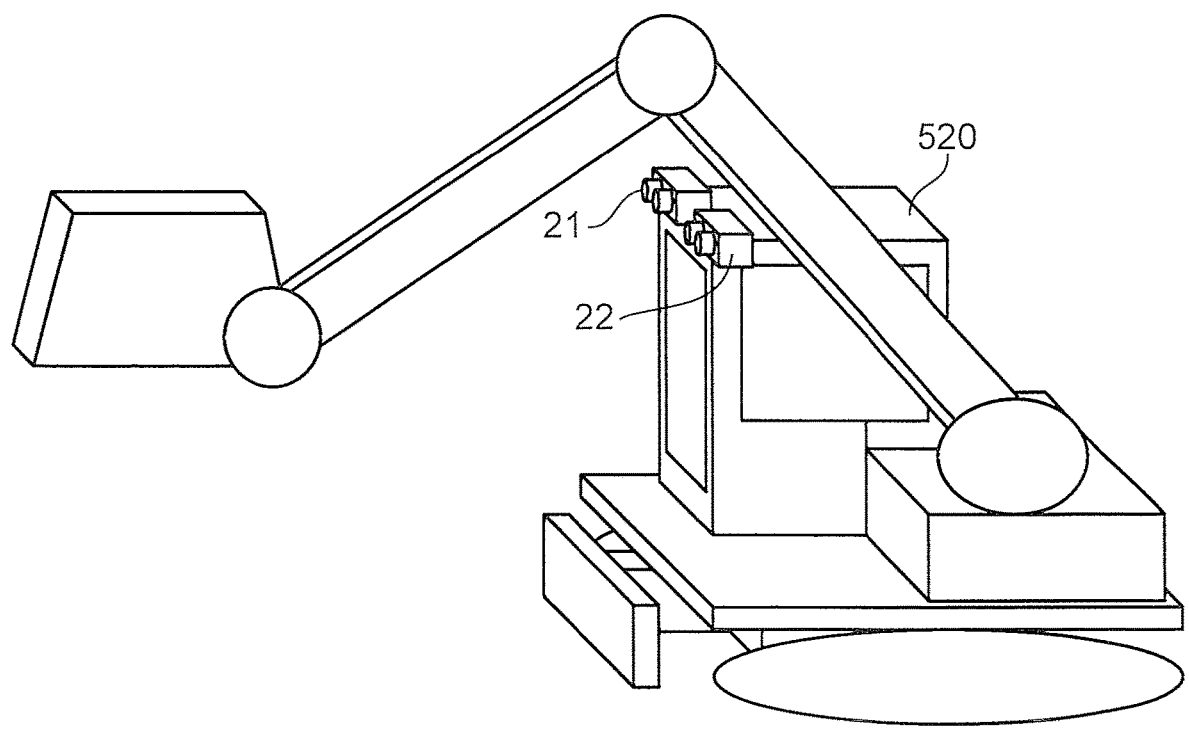
FIG. 11 is a diagram illustrating a conventional technique.

FIG. 8 is a diagram illustrating a work device 41 in modification 3 in a simplified manner. The work device 41 includes an offset boom 151 (one example of a second boom) provided between the boom 15 (one example of a first boom) and the arm 16. The offset boom 151 is pivotably attached in a direction intersecting a rise and fall direction D15 of the boom 15. Specifically, the offset boom 151 is pivotably attached in a pivoting direction D151 in a plane orthogonal to a plane including the rise and fall direction D51. Here, an unillustrated angle sensor is attached to a pivoting position of the offset boom 151, and a rotation angle θ4 of the offset boom 151 is detected using this angle sensor. The arm 16 is pivotably attached to the offset boom 151.

Since such a work device 41 has a high degree of freedom in the posture the work device 41 can take, the attachment 17 or the grasped object of the attachment 17 may be positioned on the near side of the boom 15 as seen from the cab 31.

Therefore, in the construction machine 1 including the work device 41, it is particularly useful to use the methods described in modifications 1 and 2.

In the construction machine 1 including the work device 41, the offset boom 151 is also considered to be free from interference in the cab 31 from a design point of view. Therefore, in the work device 41, in addition to the boom 15, the offset boom 151 may also be handled as the specified movable part.

In this case, in addition to the rotation angle θ1 of the boom 15, the region removing unit 121 may identify the postures of the boom 15 and the offset boom 151 by using the rotation angle θ4 of the offset boom 151, determine the pixel data corresponding to the boom 15 and the offset boom 151 in the distance image data from the identified postures, and remove the determined pixel data from the distance image data.

In this case, in addition to the correspondence information indicating correspondence between the rotation angle θ1 and the coordinate region of the boom 15, the region removing unit 121 may previously have correspondence information indicating correspondence between the rotation angle θ4 and the coordinate region of the offset boom 151. Then, by using these correspondence information, the region removing unit 121 may determine the coordinate region corresponding to the rotation angles θ1 and θ4, and remove the pixel data constituting the coordinate region from the distance image data.

When applying the method of modification 1 to modification 3, the region removing unit 121 assumes that the cross-section and length of the offset boom 151 are known, and may calculate a square pillar extended by a length of the offset boom in a direction of the rotation angle θ4 from a tip of the three-dimensional region of the offset boom 151, as the three-dimensional region of the offset boom 151.

Then, from among the pixel data constituting the coordinate region, the region removing unit 121 may remove the pixel data included in the three-dimensional region of the boom 15 and the offset boom 151 from the distance image data, and cause pixel data that is not included in the three-dimensional region of the boom 15 and the offset boom 151 to remain in the distance image data. This can prevent the interference object located on the near side of the boom 15 and the offset boom 151 from being removed from the distance image data.

When applying the method of modification 2 to modification 3, the region removing unit 121 may calculate the three-dimensional regions of the boom 15 and the offset boom 151 by using the above-described method, from among the pixel data constituting the distance image data, remove the pixel data included in the three-dimensional region from the distance image data, and cause pixel data that is not included in the three-dimensional region to remain in the distance image data.

Note that in modification 3, the offset boom 151 is included in the specified movable part; however, if the construction machine 1 includes a dozer in the lower traveling body 2, this dozer may be included in the specified movable part.

(Modification 4)

In the present invention, the aspect to remove the pixel data corresponding to the specified movable part from the distance image data includes an aspect to set the pixel data corresponding to the specified movable part as invalid pixel data without actually removing the pixel data, and to disregard the pixel data when the interference determination unit 122 determines danger of interference.

The features of the embodiment described above are summarized as follows.

An interference prevention device for a construction machine according to one aspect of the present invention is an interference prevention device for a construction machine including a work device including a plurality of movable parts and having a changeable posture, a cab, and a main body on which the work device and the cab are mounted. The interference prevention device includes: a distance sensor configured to acquire distance image data indicating distance distribution in a surrounding environment of the cab; an interference determination unit configured to detect an interference object that is the work device or a grasped object of the work device by using the distance image data acquired by the distance sensor, and determine danger of interference of the detected interference object in the cab; an interference prevention unit configured to perform at least one of a warning to an occupant and operation restriction of the construction machine when the interference determination unit determines that there is the danger of interference; an acquisition unit configured to acquire posture information indicating a posture of the work device; and a region removing unit configured to determine pixel data corresponding to a specified movable part that does not interfere in the cab among the plurality of movable parts in the distance image data by using the posture information acquired by the acquisition unit, and remove the determined pixel data from the distance image data. The interference determination unit determines the danger of interference by using the distance image data from which the pixel data corresponding to the specified movable part has been removed.

According to this aspect, by using the posture information of the work device acquired by the acquisition unit, from among the plurality of movable parts constituting the work device, the pixel data in the distance image data corresponding to the specified movable part that does not interfere in the cab is determined, and this pixel data is removed from the distance image data. Then, the interference determination unit determines the danger of interference in the cab caused by the interference object that is the work device or the grasped object of the work device, by using the distance image data from which the pixel data corresponding to the specified movable part has been removed.

Therefore, even if the specified movable part enters the detection range of the distance sensor, it is possible to prevent the specified movable part from being falsely detected as the interference object, and to prevent unnecessary operation restrictions and issue of warnings. Furthermore, since it is unnecessary to dispose the distance sensor such that the specified movable part is excluded from the detection range, it is possible to prevent the detection range from becoming narrow and to prevent that the interference object to be originally detected cannot be detected.

In the aspect described above, according to the posture information, the region removing unit may determine the pixel data corresponding to the specified movable part by using correspondence information indicating in advance in which coordinate region the specified movable part is located in the distance image data.

According to this aspect, since the pixel data corresponding to the specified movable part is determined according to the posture information by using the correspondence information indicating in advance in which coordinate region the specified movable part is located in the distance image data, a processing load for removing the pixel data corresponding to the specified movable part from the distance image data can be reduced.

In the aspect described above, the region removing unit may calculate a three-dimensional region of the specified movable part in a three-dimensional coordinate system of the distance sensor by using the posture information acquired by the acquisition unit, from among the pixel data determined using the correspondence information, remove the pixel data included in the three-dimensional region from the distance image data, and cause the pixel data that is not included in the three-dimensional region to remain in the distance image data.

When the pixel data corresponding to the specified movable part is uniformly removed from the distance image data by using the correspondence information, since located on the near side of the specified movable part, the interference object reflected in superimposition on the specified movable part in the distance image data may be removed from the distance image data.

In this aspect, the three-dimensional region of the specified movable part in the three-dimensional coordinate system of the distance sensor is calculated using the posture information, from among the pixel data determined using the correspondence information, the pixel data included in the three-dimensional region of the specified movable part is removed from the distance image data, and the pixel data that is not included in the three-dimensional region of the specified movable part remains in the distance image data. Therefore, even when the interference object is superimposed on the specified movable part in the distance image data, it is possible to prevent the interference object from being removed from the distance image data.

In the aspect described above, the region removing unit may calculate a three-dimensional region of the specified movable part in a three-dimensional coordinate system of the distance sensor by using the posture information acquired by the acquisition unit, from among pixel data constituting the distance image data, remove pixel data included in the three-dimensional region from the distance image data, and cause pixel data that is not included in the three-dimensional region to remain in the distance image data.

According to this aspect, the three-dimensional region of the specified movable part in the three-dimensional coordinate system of the distance sensor is calculated using the posture information, from among the pixel data constituting the distance image data, the pixel data included in the three-dimensional region is removed from the distance image data, and the pixel data that is not included in the three-dimensional region remains in the distance image data. Therefore, even when the interference object is superimposed on the specified movable part in the distance image data, it is possible to prevent the interference object from being removed from the distance image data.

In the aspect described above, the specified movable part may be a boom adjacently connected to the cab such that the boom is allowed to be raised and lowered in the main body.

According to this aspect, since information about the boom that is free from interference in the cab is removed from the distance image data, it is possible to prevent the boom from being detected as the interference object.

In the aspect described above, the boom may include a first boom adjacently connected to the cab such that the boom is allowed to be raised and lowered in the main body, and a second boom pivotably attached to the first boom in a direction intersecting a rise and fall direction of the first boom.

In addition to the first boom, the work device including the second boom pivotably attached in the direction intersecting a rise and fall region of the first boom has a high degree of freedom of the posture the work device can take. Therefore, the frequency at which either boom enters the detection range of the distance sensor is high.

In this aspect, since the first and second booms are specified movable parts, information about both of the booms is removed from the distance image data. Therefore, it is possible to prevent false detection of both of the booms as the interference objects, and to prevent frequent occurrence of unnecessary operation restrictions and warnings.

In the aspect described above, the distance sensor may include a light source that emits an infrared ray and a camera that receives reflected light of the infrared ray.

In recent years, the distance sensor including the light source that emits an infrared ray and the camera that receives reflected light of the infrared ray has increasingly been put into practical use as an input interface for consumer games and has high reliability. This aspect, which employs such a distance sensor, can implement reliable distance measurement.

In the aspect described above, the distance sensor may include a stereo camera.

In recent years, the distance sensor including a stereo camera has increasingly been put into practical use in automotive applications and the like, and has high reliability. This aspect, which employs such a distance sensor, can implement reliable distance measurement.

The invention claimed is:

1. An interference prevention device for a construction machine that includes a work device, the work device including a boom raisably connected to a main body of the construction machine adjacently to a cab of the construction machine, an arm pivotably attached to a tip portion of the boom, and an attachment pivotably attached to a tip portion of the arm, the interference prevention device comprising:
   an acquisition unit comprising acquisition circuitry configured to acquire posture information indicating a posture of the work device of the construction machine;
   a distance sensor comprising distance sensor circuitry configured to acquire distance image data indicating distance distribution in a surrounding environment of a cab in the construction machine; and
   a controller comprising control circuitry configured to determine pixel data corresponding to the boom in the distance image data by using the posture information acquired by the acquisition unit,
   remove the pixel data from the distance image data,
   detect the work device or a grasped object of the work device from the distance image data without the pixel data corresponding to the boom,
   determine that danger of interference exists when the work device or the grasped object enters a region set for a predetermined distance away from the cab, and
   perform at least one of a warning to an occupant in the cab and operation restriction of the construction machine when the danger of interference is determined to exist.

2. The interference prevention device according to claim 1, wherein the control circuitry of the controller is configured to determine, based on the posture information acquired by the acquisition unit, the pixel data corresponding to the boom by using correspondence information indicating in advance in which coordinate region the boom is located in the distance image data.

3. The interference prevention device according to claim 2, wherein the control circuitry of the controller is configured to calculate a three-dimensional region of the boom in a three-dimensional coordinate system of the distance sensor by using the posture information acquired by the acquisition unit, from among the pixel data determined using the correspondence information, remove the pixel data included in the three-dimensional region from the distance image data, and cause the pixel data that is not included in the three-dimensional region to remain in the distance image data.

4. The interference prevention device according to claim 1, wherein the control circuitry of the controller is configured to calculate a three-dimensional region of the boom in a three-dimensional coordinate system of the distance sensor by using the posture information acquired by the acquisition unit, from among pixel data constituting the distance image data, remove pixel data included in the three-dimensional region from the distance image data, and cause pixel data that is not included in the three-dimensional region to remain in the distance image data.

5. The interference prevention device according to claim 1, wherein the boom includes a first boom raisably connected to the main body adjacently to the cab, and a second boom pivotably attached to the first boom in a direction intersecting a rise and fall direction of the first boom.

6. The interference prevention device according to claim 1, wherein the distance sensor includes a depth sensor comprising a light source that emits an infrared ray and a camera configured to receive reflected light of the infrared ray.

7. The interference prevention device according to claim 1, wherein the distance sensor includes a stereo camera.

8. The interference prevention device according to claim 2, wherein the boom includes a first boom raisably connected to the main body adjacently to the cab, and a second boom pivotably attached to the first boom in a direction intersecting a rise and fall direction of the first boom.

9. The interference prevention device according to claim 2, wherein the distance sensor includes a depth sensor comprising a light source that emits an infrared ray and a camera configured to receive reflected light of the infrared ray.

10. The interference prevention device according to claim 2, wherein the distance sensor includes a stereo camera.

11. The interference prevention device according to claim 4, wherein the boom includes a first boom raisably connected to the main body adjacently to the cab, and a second boom pivotably attached to the first boom in a direction intersecting a rise and fall direction of the first boom.

12. The interference prevention device according to claim 4, wherein the distance sensor includes a depth sensor comprising a light source that emits an infrared ray and a camera configured to receive reflected light of the infrared ray.

13. The interference prevention device according to claim 4, wherein the distance sensor includes a stereo camera.

14. The interference prevention device according to claim 1, wherein the acquisition circuitry of the acquisition unit comprises a plurality of angle sensors positioned on a plurality of rotational fulcrums in the construction machine such that each of the angle sensors is configured to measure a rotational angle of a respective one of the movable parts in the construction machine.

15. The interference prevention device according to claim 1, wherein the acquisition circuitry of the acquisition unit comprises a plurality of angle sensors positioned on a plurality of rotational fulcrums in the construction machine such that each of the angle sensors is configured to measure a rotational angle of a respective one of the movable parts in the construction machine, and the boom includes a first boom raisably connected to the main body adjacently to the cab, and a second boom pivotably attached to the first boom in a direction intersecting a rise and fall direction of the first boom.

16. The interference prevention device according to claim 1, wherein the region set the predetermined distance away from the cab has a warning region set for a first distance away from the cab and an automatic driving region set for a second distance away from the cab such that the first distance is farther away from the cab than the second distance, and the control circuitry of the controller is configured to determine that the danger of interference exists when the work device or the grasped object enters the warning region, perform the warning to the occupant in the cab when the work device or the grasped object enters the warning region, and perform the operation restriction of the construction machine when the work device or the grasped object enters the automatic driving region.

17. A construction machine, comprising:
the interference prevention device of claim 1.

* * * * *